Figure 3:
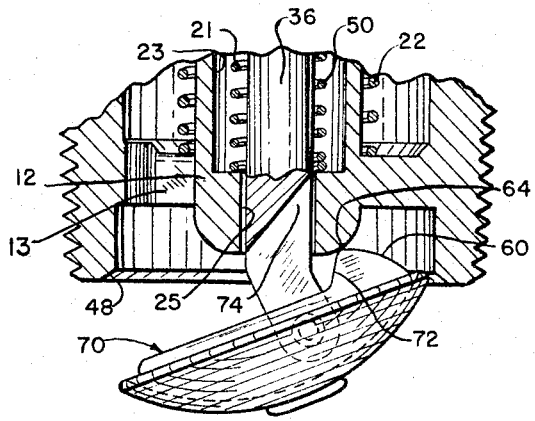

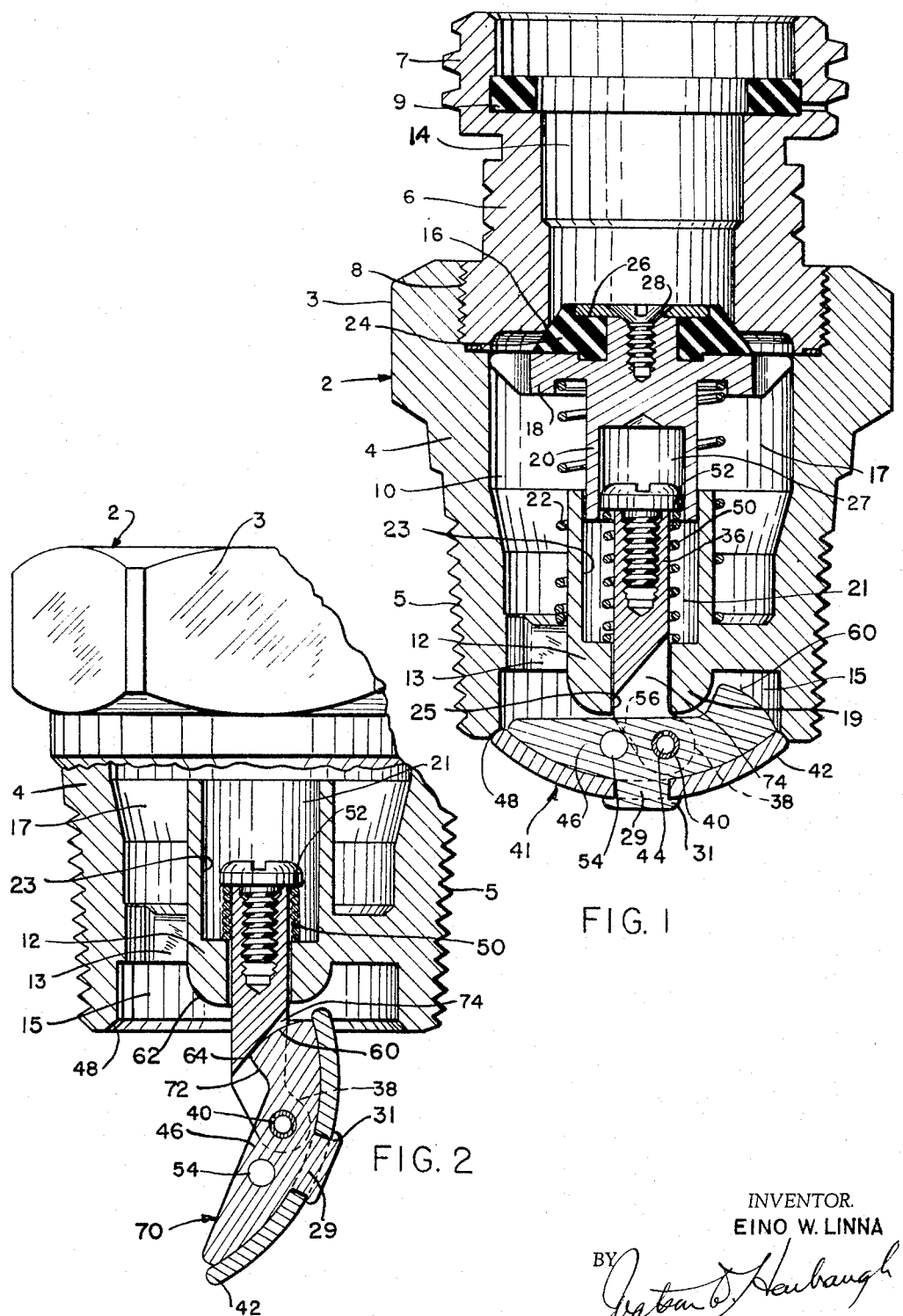

INVENTOR.
EINO W. LINNA

ATT'Y.

INVENTOR.
EINO W. LINNA

United States Patent Office 3,283,778
Patented Nov. 8, 1966

3,283,778
DOUBLE CHECK VALVE
Eino W. Linna, Lombard, Ill., assignor to The Bastian-Blessing Company, Chicago, Ill., a corporation of Illinois
Filed May 22, 1964, Ser. No. 369,574
11 Claims. (Cl. 137—512.3)

This invention relates generally to valves, and more particularly to an improved valve construction for use in handling liquefied gases particularly in filling and emptying a container or tank having propane or ammonia retained therein under pressure in both its liquid and vapor phases.

In the handling and use of a liquefied gas, customer storage tanks are normally employed at the places of gas consumption which are refilled periodically from tank trucks. Valves embodying the invention are intended primarily for use in the filling conduit of such storage tanks, but depending on size they also may be used on the tank truck or on larger bulk storage tanks from which tank trucks are filled.

It has become rather a standard practice in the industry to provide in such filling conduits a double check valve arrangement, as shown in the Norway Patent Nos. 2,967,541 and 2,361,866 and in co-owned patents and improvements thereon including the Sundstrom Patent No. 2,713,874 and Poethig Patent No. 2,813,402. Such arrangements have been used in unitary fittings both separately and in various combinations with liquid level gauges, vapor return valves, service eduction valves, safety valves, etc. in multiple purpose fittings.

Double check valves have been well accepted in the industry for several reasons but essentially because they assure a leak proof closure for the filler opening. The sealing element of the outer check valve can be replaced periodically to guarantee long periods of leak proof operation. A double check valve also provides an extra measure of safety in the event of damage to the filling hose or pipe or to either one of the check valves. Their acceptance prevails in spite of the fact that the tandem valves increase initial cost and cut down the flow rate appreciably over a single valve.

The industry has been willing to endure this reduction in filling rate because the advantages of such a construction outweighed the disadvantages. However, more and more in recent years increasing economies in operations have placed emphasis on reducing the time required for liquid transfer operations, and although higher capacity pumps, meters and particularly larger hoses and conduits help to increase filling rates by reducing the effect of friction upon flow in conduits even though initial cost may be higher, the reductions of restrictions to the flow of liquid through necessary valves and of turbulence are also very important factors in increasing filling rates. Three factors are involved: friction in conduits, restrictions and turbulence. Of these three the invention is concerned with the latter two.

Accordingly one of the objects of this invention is to provide a check valve construction for use either as a single valve or as one of a double check valve arrangement which affords all of the safety and leak proof advantages of the best of the earlier valve constructions yet greatly increases the filling rate capacity over that of the prior devices. This is accomplished in a check valve body of the customary size by moving the valve member during its opening movement to a position that is edgewise to the path of flow through the valve seat whereby a very narrow silhouette or profile is presented to the liquid flowing through the valve seat.

Another object of the invention is to provide in a standard size body a check valve having the relatively unrestricted high flow characteristics of a butterfly-type valve, the operating advantages present with an axially movable or poppet check valve and the capabilities of a rounded head valve closure in handling liquefied gas in its liquid phase with minimum turbulence.

Another object of the invention is to provide a valve operation in an axial flow check valve body which places no flow restriction upon the rate of liquid flow through the spider supporting the valve yet the check valve is movable wholly within the internal conduit diameter of the valve body below the valve seat.

These objects will be further understood when it is noted that prior check valves either move axially without any pivoting, or if pivotally mounted the pivotal axis is fixed and does not change its position. Furthermore, pivotally mounted conventional swinging check valves require lateral enlargement of the valve body to accommodate the greater throw required for valve movement.

The invention in accomplishing the many advantages and novel results set forth herein is characterized by a concave-convex disc-type closure member pivotally mounted at a point moderately eccentric to the axis of the valve seat on a pin carried by and movable bodily with a check valve stem that is rotatable and slidably mounted in a spider that is customarily provided for valve support in an axially flow check valve body. This provides a closure valve head area that is supported eccentrically yet presents a configuration concentric to the valve seat but presents to the liquid flowing through the port portions of the head area having major and minor radii disposed on opposite sides of a transverse pivotal axis. The area portion having the major radius dominates the pivotal movement or tilt of the valve member when opening under fluid flow through the valve port. A cam arrangement between the valve member and valve body controls the relative tilt of the valve head upon its opening movement and upon its closing movement a stop orients it to the valve seat whether urged to close by spring or by the backflow of fluid through the valve port.

In this connection if the invention is to be used as a normally closed check valve a spring is employed to urge the valve to a closed position. On the other hand, if the invention is to be used as a normally open valve such as a back flow check valve or an excess flow check valve, it is gravity oriented or provided with a spring for movement to a normally open position and stops are provided on the supporting stem to limit not only the opening distance but concurrently therewith the face angle presented by the valve head to the fluid flow for various flow rates. It is important to note that in connection with the area portion of the valve head having the major radius the valve head tilt is particularly significant as disposed in the path of flow of fluid.

The present invention allows external threads on the valves to be threaded directly into a flange welded directly to a tank or a standard pipe coupling member, which in turn may be fitted to a further length of pipe of the same rated size.

A further object of this invention is found in the improved liquid in-flow pattern in the vapor space of a tank when a filler valve embodying the invention is mounted directly to a tank. The valve head element is located within the confines of the tank interior. Heretofore it has been found that a spray pattern is desirable to restrain increasing tank pressures incurred during filling operations. An umbrella pattern has been used heretofore with little turbulence induced in the body of liquid in the tank. The flow pattern of the valves embodying the invention provides many advantages. Not only does a spray pattern rebound from the concave side of the disc but a large portion surges into the body of liquid in the tank and froths it for cooling and condensing tank pressure.

Figure 4:
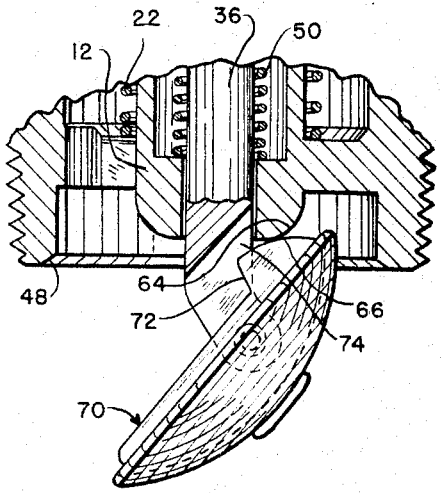
Figure 5:
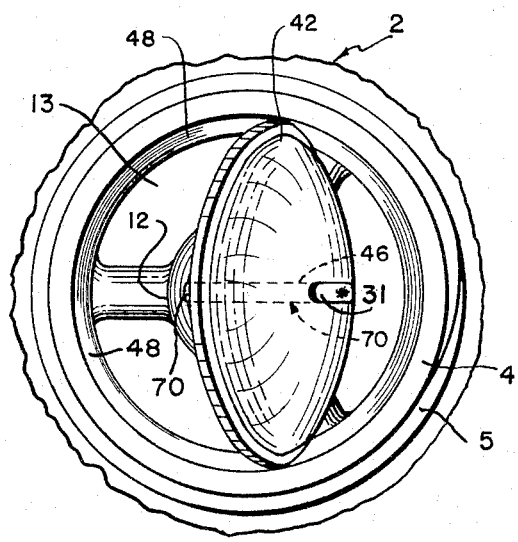
Figure 6:
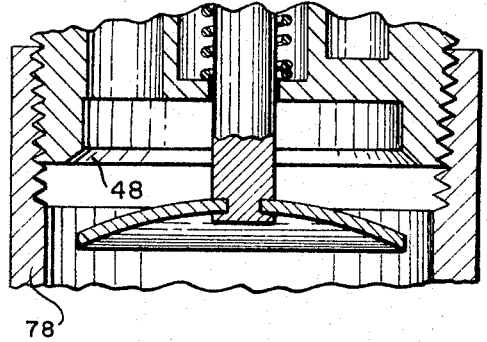
Figure 7:
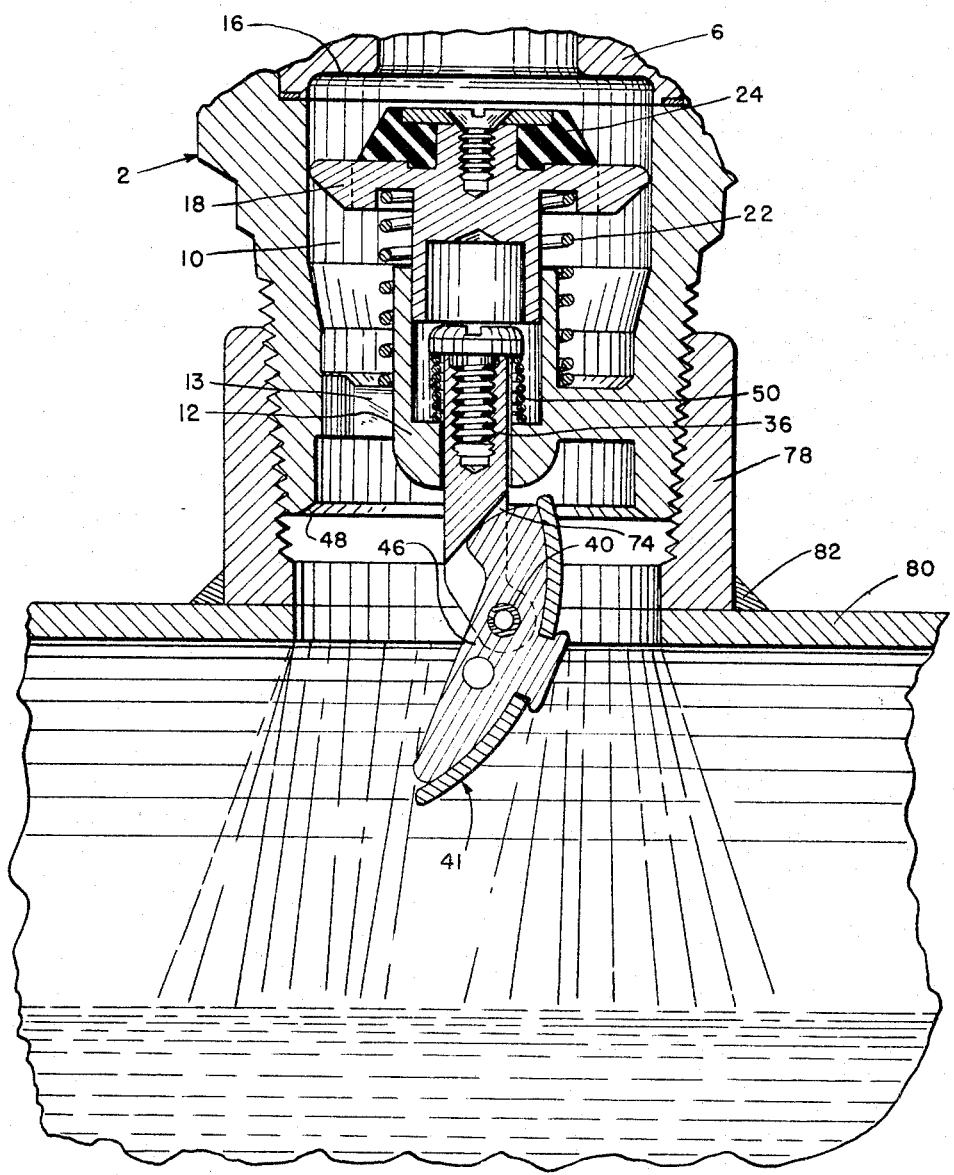

Other objects and advantages of this invention will be more readily apparent to those familiar with the art by examination of the following specification and drawings in which:

FIG. 1 is a cross-sectional side view of a double check valve embodying the invention and showing the valves in their fully closed position, FIG. 2 is a partially sectioned view of the invention embodied in a single check valve and shows the valve in its fully opened position, FIG. 3 is a section view showing the valve in an early stage of opening, at which stage the valve may be stationed when arranged to serve as an excess flow valve, FIG. 4 is a section view similar to FIG. 3 but showing the valve in a later stage of opening, FIG. 5 is a bottom plan view of the valve mounted in a conduit in fully open position of FIG. 2 and showing the relative flow areas of the spider, valve and conduit, FIG. 6 is a section view of a conventional disk type check valve mounted in a conduit like that in FIG. 5, and for comparison with respect to relative flow areas, and FIG. 7 is a cutaway cross-sectional view of the invention being utilized in a double check filler valve fitted to a tank.

Although the invention may be embodied with elements incorporated in valve body forms of various sizes and shapes including those receiving other valve outlets and devices for handling liquefied gases in storage tanks under pressure, its description is simplified herein as incorporated in a single valve body for a single check valve or a double check valve application which can be individually installed on a conduit or in a tank wall.

Referring now to FIG. 1, a valve is shown at 2 having a main body portion 4 provided with a wrenching surface at 3 and an externally threaded end at 5 for mounting in a coupling 78 or tank 80. An upper portion 6 is threaded to the main body in sealed relationship therewith at 8 and is provided with an Acme thread 7 for detachably receiving thereon a hose connection. The portion 6 is internally recessed to carry a sealing washer 9 that cooperates with the end of the nipple (not shown) of the hose connection. The upper body portion 6 below the washer 9 has a bore 14 therethrough terminating at its lower end in a valve seat 16 disposed in an enlarged valve compartment 17 that is formed in the upper part of the main body portion 4. The lower end of the main body portion terminates in a valve seat 48 open to a tank or conduit therebeyond.

A spider 12 is disposed between the compartment 17 and valve seat 48. The spider has conduits 13 for the flow of liquefied gas therethrough and is constructed and arranged as later described to support both the upper check valve 18 to cooperate with the valve seat 16 and the lower check valve to cooperate with the seat 48. The bore 14, compartment 17, passages 13 and an annular recess 15 around the central boss 19 in the lower end of the main body portion 4 form a passageway through the valve body 2 hereafter identified by the numeral 10.

The upper valve member 18 is centrally mounted in passageway 10 on its valve stem 20 and the valve stem is slidably received in guided relationship in an enlarged portion 21 of an axial bore 23 through the hub 19 of the spider 12. A coil spring 22 is positioned between the spider 12 and the valve member 18 to urge the disc to its closed position against the valve seat. Fluid entering bore 14 from a filler hose attached to the upper body portion 6 forces valve member 18 away from the valve seat when overcoming the force of spring 22. Any reversal of flow or drop in pressure below that required to open the valve permits the valve to close again. Valve member 18 is constructed with a removable sealing element 24 in the shape of an annulus which is held to the valve member by a washer 26 secured by a screw 28. Therefore, should the valve ever begin to leak and the element must be replaced, it can be done either after emptying the tank or a second valve can be provided below this check valve to protect against excessive escape of gas while the check valve is being repaired. Preferably a second check valve is employed to facilitate the disassembly of the first valve for replacement of the sealing element and this valve can incorporate many added safety measures.

In this connection it is to be noted that the rate of flow permitted by this valve is determined by the flow area of the valve seat and the annular space between the disk valve 18 and the wall of the compartment 17 radially adjacent thereto whichever is the lesser area.

Still referring to FIG. 1, a second valve 41 is shown having a valve stem 36 carried by the spider 12 in a relationship guided in the small portion 25 of the bore 23. In this arrangement a screw 52 threaded into the stem 36 to support the spring 50 telescopes into the bore 27 on the lower end of the upper valve stem 20. The spring urges closure of the valve. The lower end of the stem 36 has a projection or arm 38 thereon offset to the center line of the stem. A valve disc 42 having a spherical segment configuration is pivotally mounted on the valve stem by means of a pin 44 which passes through the arm 38 on the valve stem and a rib or brace member 46 riveted on the concave side of the valve disc by the end of a boss 29 being swaged over on the convex face side of the disc 42. Mounting of the valve disc to the offset arm in this manner imparts an eccentric pivoted action to the disc upon opening which moves the disk 42 edgewise to liquid flowing through the valve seat 48. Here again the flow area of the valve disc is the space between its marginal edge and the inside of a pipe coupling 78 (FIG. 5) around the valve seat 48. In this instance the edge of the valve disk presents a narrow elliptical silhouette in the inside diameter circle of the pipe coupling 78 or valve seat 48.

Comparing for a moment the maximum annular flow area between a circle silhouette of a conventional valve disc and the circle silhouette of the conduit wall below the valve port, the valve disc has to move axially a distance great enough for the surface of revolution defined by the movement of the disk edge away from the valve seat equals or slightly exceeds said annular flow area. This entails a conduit size large enough to provide a flow area equal to or greater than the flow area of the valve port to reduce the restrictive effect of turbulence and redirection of flow.

In the present invention, within the same distance of axial movement of the valve stem the conduit wall circle silhouette can be smaller, in fact as small as the valve seat, because the valve simultaneously moves from a circular to an elliptical silhouette whereby the flow area is increased by the introduction of a minor radius in the formula Area=$\pi r^2$. This is further augmented by the pivotal support of the valve disc being eccentrically disposed and controlled by a cam contour profiled for a selected action.

Considering for the moment that the conduit diameter below the valve seat 48 is substantially that of the valve seat and noting that the ultimate opening of the valve disc provides a tilt of 65°, a flow area is provided that is 60% of the total area of the valve port 48 and slightly less than the flow area of the spider which is approximately 80% of the area of the valve port 48. Thus, with the flow area of the port 48 considered as unity the following comparison can be made:

| | Flow area |
|---|---|
| FIG. 6 conventional valve | 48% |
| FIG. 2 new valve 41 | 60% |
| FIG. 2 spider 12 | 80% |
| FIG. 1 upper valve 18 | 50% |

Consequently, with an 80% flow through the spider 12 and 60% flow through the open tilted valve disc 42, it is readily apparent that a single valve construction embodying the invention in a conduit no bigger than its diameter will flow more liquid than a conventional valve, as shown in FIG. 6, having a larger conduit diameter. This is particularly true since there is little if any frictional restriction or turbulence present that is incurred conventionally with a double redirection of flow at the valve edge. In the present invention the flow is essentially rectilineal.

Now with the conventional coupling 78 in FIG. 6 used with the novel valve 41 as shown in FIG. 5 the 48% annular flow area is added to the 60% new valve flow area and the only effective remaining restriction is the spider which affords only an 80% flow area.

Thus, with a coupling size receivable on the thread 5 of the valve body (FIG. 1) the only restriction of flow is the spider itself or the limited flow capacity of the upper valve 18 if one is present which in the embodiment shown in FIG. 1 has a 50% flow area. Incidentally, the flow area of the conventional lower disc valve in FIG. 6 into a conduit larger than the valve port is the same as the flow area of the upper valve 18. Either one of these is still less than the flow area of the valve embodying the invention flowing into a conduit the same size as the valve port.

Approached another way, with the valve embodying the invention opening into a pipe coupling, the flow area is greater than the valve port 48 and only restriction upon flow is in the spider. This is an 80% flow area as compared with a 60% flow area of a conventional valve of the same diameter. Tests have borne this out. The conventional valve fills at 64 gallons per minute and the new valve fills at 103 gallons per minute, both at a 10 p.s.i.g. drop and with the same upper valve 18. This shows a further result that the flow characteristic of the upper valve is greatly improved where restrictions and turbulence therebelow are greatly reduced.

Now referring to FIGS. 1, 3, 4 and 5, with these flow characteristics set forth the operation of the invention will be better understood wherein fluid entering bore 14, opens valve member 18, enters chamber 10 and thereupon contacts valve disc 42. Valve disc 42 and its valve stem 36 are therefore urged downwardly against the force of the comparatively light spring 50 and the valve 42 begins to tilt on its eccentric mounting 40 to assume the position shown in FIG. 3. In this position, a coaction begins between a camming surface 60 on the brace portion 46 of the valve disc and an annular shoulder 62 on the guide portion 12. The initial contact, as shown at 64 in FIG. 3, progresses to the point 66 in FIG. 4. This moving point of contact acts as a fulcrum for a leverage action caused by the impinging of the liquid on the opposite edge of the valve disc. As this force increases with increased flow the disc is urged to pivot further and in doing so, urges the valve stem further away from its at-rest position against the force of the spring and the shoulder 62 begins to carry more and more of the spring effort to let the valve move to its tilt limit in open position.

The mechanism finally assumes the wide open position shown in FIG. 2 in which position the camming surfaces are no longer in contact with one another, the force of the liquid at the point 70 now being sufficient of itself to hold the valve and valve stem down against the force of the spring. The initial edge 72 of the camming surface 60 enters a relief slot 74 in the valve stem as the valve begins to assume the full tilt position and further tilt is prevented. This can be seen in both FIGS. 2 and 4.

Upon shutoff the cam surfaces provide a guiding relationship to insure proper reseating of the valve disc. In this connection attention is directed to a cross pin member 54 on the brace 46 which contacts the arms 38 and 56 to limit the back swing of disc 42 in its reverse and closing movements.

It will be observed that the degree of opening of the valve 42 accelerates with equal increments of movement of the valve stem and the reverse is true upon closing. In all of its movements the eccentric edge of the valve disc moves radially above the valve seat 48 due to the cam action for ease in closing regardless of the relative position of the valve rotatively in the valve body. Thereby, the valve further lends itself to excess flow check valve applications when spring pressed to a limited open position. Its action is without undue slamming since the first part of the valve to close moves in a radial direction already in contact with the valve body and valve seat.

In event the valve arrangement shown in FIG. 1 is connected to the tank as a filler and evacuation valve, interference between the two valve stems 20 and 36 as shown and described in the patents mentioned herein will open the valve 41 when the valve 18 is positively opened whereupon the lower valve will be kept by out flowing liquid from tilting and can serve as a poppet type valve during eduction.

Referring now to FIG. 2, a modification is shown utilizing the teachings of this invention, wherein only the lower swinging check mechanism is used. In this construction an external shutoff valve might be connected to the valve to provide the ultimate relatively solid conical pattern.

This further indicates that the valve can be used directly in a threaded coupling 78 without a laterally enlarged throat because the check valve member is not attached at its periphery to the wall or housing of the valve and is free to swivel with the valve stem if it rotates.

Referring now to FIG. 7, the valve embodying the invention is shown in an open position with liquid passing therethrough into a tank 80. The valve is threaded to a coupling 78 which, in turn, is welded to the tank 80 at 82. The importance of an intimate contact between incoming cool droplets of liquid and vapor already present in the tank and a churning at the surface of the body of liquid in the tank has long been appreciated. The liquid droplets cool the vapor, thus alleviating an excessive build-up of pressure within the tank which will burden the liquid pump with an increasing back pressure. This becomes more and more critical as the tank approaches its filled condition. The liquid level rises and the pressure of uncondensed vapor rises as a geometrical progression.

The liquid entering the tank through the valve of this invention is sprayed into the vapor space of the tank with a relatively solid conical pattern thereby inducing a more dynamic contact between vapor and incoming liquid in which the surface of liquid body in the tank is frothed for vapor condensation thus further enhancing the performance results attained by filler valves embodying the invention.

Having thus described my invention, it will be understood by those skilled in the art how the various stated objects are obtained and how various and further advantages and results are provided and how various and further uses of valves embodying the invention can be made without departing from the spirit of the invention which is commensurate with the appended claims.

What is claimed is:

1. A check valve comprising a body having a flow conduit therethrough,
   a valve seat adjacent one end of the conduit, valve means disposed concentrically to the valve seat in closed position,
   spider means in said conduit spaced from the valve seat,
   a valve stem reciprocably mounted in said spider means,
   pivot means interconnecting said valve means and said valve stem eccentrically to the axis of the valve seat,
   said valve means moving away from said valve seat to a position edgewise to the flow of fluid through the valve seat.

2. A check valve comprising a body having a flow conduit therethrough,
   a valve seat adjacent one end of the conduit defining a port area, valve means being disposed concentrically to the valve seat to close the port area, a valve stem, means for reciprocably mounting the valve stem to extend through said port area during a portion of its excursion, pivot means interconnecting said valve means and said valve stem eccentrically to the axis of the valve seat, said valve means moving with said valve stem and about the axis of said pivot means away from said valve seat to a position edgewise to the flow of fluid through the valve seat.

3. A check valve comprising a body having a flow conduit therethrough, an annular shoulder on the wall of the conduit providing a valve seat adjacent one end of the conduit defining a port area, valve means disposed concentrically to the valve seat to close said port area in its closed position, spider means in said conduit within said port area and spaced from the valve seat, a valve stem reciprocably mounted in said spider means, pivot means having an axis transverse to the line of flow through said port area interconnecting said valve means and said valve stem eccentrically to the valve seat, said valve means moving with said valve stem away from said valve seat and about said axis to a position edgewise to the flow of fluid through the valve seat.

4. The combination called for in claim 3 including a resilient means urging said valve stem to one of its limits of movement, a camming element upon the spider means, a follower element upon said valve means engaging said camming element to control the movement of said valve means about said axis in relation to the movement of said valve stem against the influence of said resilient means, said valve means varying the axial flow area of said port area at a greater rate per increment of movement of the valve stem as it approaches wide open position.

5. A check valve comprising a body having a flow conduit therethrough, a valve seat adjacent one end of the conduit, spider means in said conduit spaced from the valve seat, a valve stem reciprocably mounted in said spider means, valve means disposed concentrically to the valve seat in closed position including a disc member defining a curved surface of revolution in which the concavity thereof faces the spider means, and a bracing rib element therein, pivot means interconnecting said bracing rib element and said valve stem eccentrically to the axis of the valve seat and disc member, said valve means moving away from valve seat to a position edgewise to the flow of fluid through the valve seat.

6. A filler check valve comprising a body having a flow conduit therethrough, an annular shoulder on the wall of the conduit providing a valve seat facing in the direction of flow of fluid through the conduit and defining a port area, valve means disposed concentrically to the valve seat to close said port area in its closed position, spider means in said conduit within said port area and spaced from the valve seat, a valve stem reciprocably mounted in said spider means, spring means urging said valve stem in a direction counter to said direction of flow, pivot means having an axis transverse to the line of flow through said port area interconnecting said valve means and said valve stem eccentrically to the valve seat, and said valve means moving with said valve stem away from said valve seat and about said axis to a position edgewise to the flow of fluid through the valve seat and varying the axial flow area of said port area at a greater rate per increment of movement of the valve stem as it approaches wide open position under the influence of fluid flowing through said port area.

7. A filler check valve comprising a body having a flow conduit therethrough, a valve seat on said body at the outlet end of said conduit defining a port area, valve means disposed concentrically to the valve seat to close said port area in its closed position, spider means in said conduit within said port area and terminally having a camming element defining a curved surface of revolution coaxial with said valve seat, a valve stem reciprocably and rotatably mounted in said spider means coaxial with a resilient means urging said valve stem away from said valve seat, pivot means having an axis transverse to the line of said flow through said port area interconnecting said valve means and said valve stem eccentrically to the valve seat, a follower element upon said valve means engaging said camming element to control the movement of said valve means about said axis in relation to the movement of said valve stem against the influence of said resilient means, said valve means moving with said valve stem away from said valve seat and about said axis to a position edgewise to the flow of fluid through the valve seat to increase the axial flow area of said port area of a greater rate per increment of movement of the valve stem as it approaches wide open position.

8. A check valve comprising a body with a passageway therethrough, a valve disc, a supporting member in the passageway, a valve stem reciprocably carried by the supporting member and urged to a closed position, pivotal means carried by the valve stem interconnecting said valve stem and said valve disc at a point spaced from the axis of the valve stem, guide means associated with said valve disc and valve stem to translate linear movement of said valve stem into pivotal movement of said valve disc, means between the valve disc and the body to guide the disc into an open position edgewise in the passageway with an edge portion of the valve disc within said valve seat.

9. A check valve comprising a body with a passageway therethrough terminating in a valve seat, a valve disc, a supporting member in the passageway, a valve stem reciprocably carried by the supporting member and urged to a closed position, pivotal means carried by the valve stem interconnecting said valve stem and said valve disc at a point spaced from the axis of the valve stem, means between the valve disc and the body to translate linear movement of said valve stem into pivotal movement of said valve disc and guide the disc into an open position edgewise in the passageway with an edge portion of the valve disc within said valve seat.

10. In a check valve having a body with a passageway portion terminating in a valve seat with a valve disc carried by a reciprocably mounted valve stem urged to close against the valve seat the combination of an offset element on the valve stem, pivot means interconnecting the offset element and valve disc at a point spaced from the center of the valve disc,
a cam member carried by said valve disc,
a camming surface on the valve body operatively engaged by said cam member to provide a guiding relationship to the valve disc as it pivots about said pivot means, and
a stop means between the valve stem and the valve disc to limit the pivoting action of the valve disc.

11. A double check filler valve for a liquefied gas storage tank comprising:
a valve body having a passageway therethrough,
axially spaced valve seats in said passageway facing in the direction of flow of fluid therethrough,
valve means carried by the body and adapted to close against one of said valve seats,
support means in the passageway positioned between said valve seats and adapted to support said valve means,
valve stem means reciprocably and rotatably carried by said support means,
a valve disc member pivotally mounted on said valve stem means for sealing engagement with the second valve seat, and
cam means interconnecting said valve disc and said support means,
said valve stem and said support means upon relative movement therebetween actuating said cam means to control the valve disc for movement to its open position in relation to the movement of said valve stem under the flow of liquid passing through the second valve seat.

References Cited by the Examiner
UNITED STATES PATENTS

| | | | |
|---|---|---|---|
| 1,121,199 | 12/1914 | Pace | 137—527.4 |
| 1,198,128 | 9/1916 | Hills | 137—512.3 |
| 1,744,798 | 1/1930 | Price | 137—527 |
| 2,813,402 | 11/1957 | Poethig et al. | 137—512.3 X |
| 3,013,579 | 12/1961 | Gilliam | 137—515.5 |

WILLIAM F. O'DEA, *Primary Examiner.*

ISADOR WEIL, *Examiner.*

D. ZOBKIW, *Assistant Examiner.*